Sept. 15, 1925.
E. R. CLOUD
CLAMP
Filed Sept. 15, 1924
1,553,891
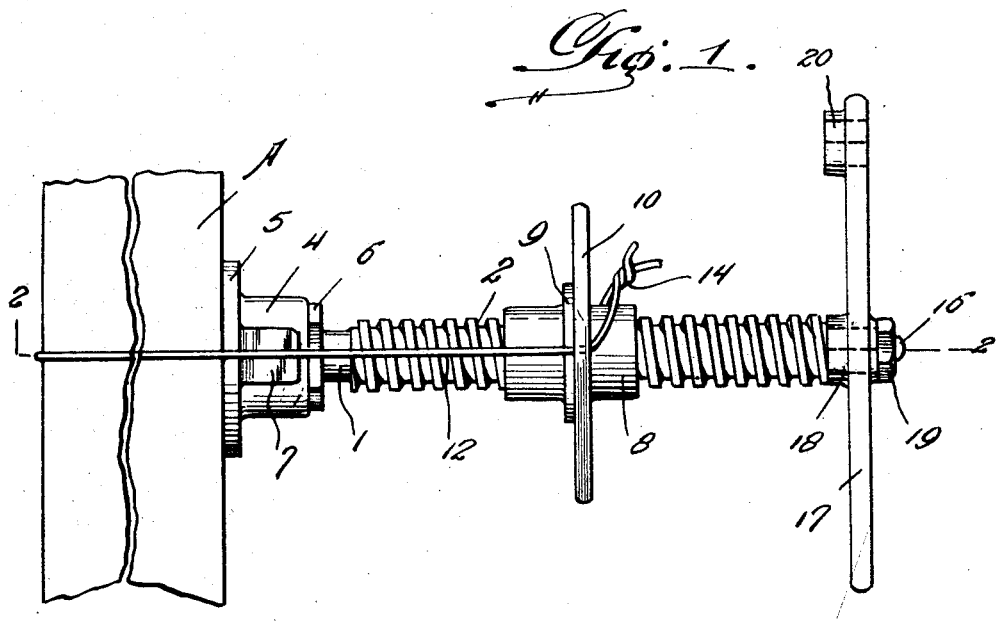
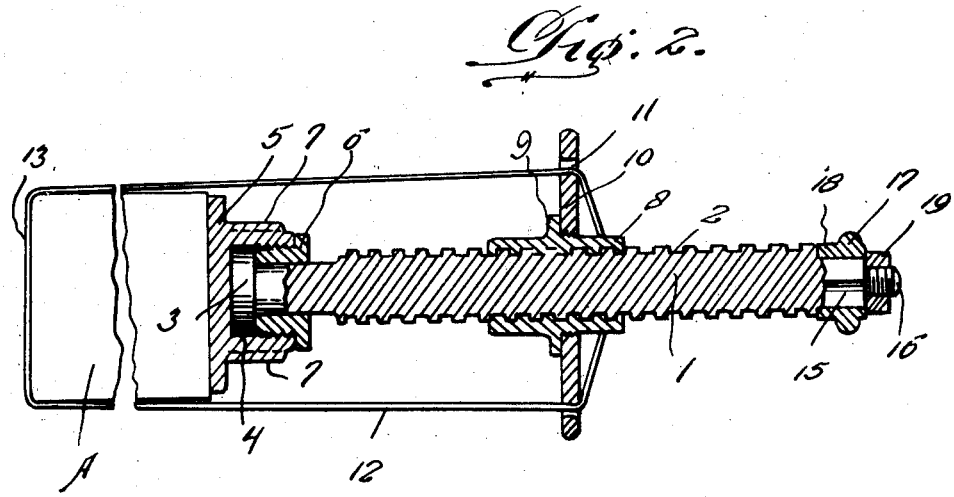
Emmett R. Cloud,
Inventor
By Clarence A. O'Brien
Attorney Patented Sept. 15, 1925.

1,553,891

UNITED STATES PATENT OFFICE.

EMMETT R. CLOUD, OF CAPITOL HEIGHTS, MARYLAND.

CLAMP.

Application filed September 15, 1924. Serial No. 737,899.

*To all whom it may concern:*

Be it known that I, EMMETT R. CLOUD, a citizen of the United States, residing at Capitol Heights, in the county of Prince Georges and State of Maryland, have invented certain new and useful Improvements in a Clamp, of which the following is a specification.

This invention relates to improvements in clamps for use in connection with concrete forms or molds or the like.

One of the important objects of the present invention is to provide a clamp of the above mentioned character which may be readily and easily adjusted in position with respect to the object or device with which the same is associated for holding the latter in the desired position.

A further object of the invention is to provide a clamp of the above mentioned character, which may also be used in securing broken portions together when the latter are cemented or otherwise put together.

A still further object of the invention is to provide a clamp of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of the clamp embodying my invention, and

Figure 2 is a longitudinal sectional view taken approximately on line 2—2 of Figure 1.

In the drawing wherein for the purpose of illustration is shown the preferred embodiment of my invention, the numeral 1 designates an elongated shaft which has the spirally arranged threads 2 formed thereon for the greater length thereof. The forward end of the shaft has a head 3 thereon, the same being adapted to be supported in the socket portion 4 of the bearing head 5, the outer face of which is substantially flat and adapted for engagement with one side of the object with which the clamp is associated.

The bearing head 5 has the socket 4 thereof internally threaded for a suitable distance to receive the locking nut 6 which provides a means for preventing the displacement of the head and forward end 3 of the shaft 1 from the bearing head and enables the bearing head to be swivelly supported on the forward end of the shaft. This construction is more clearly illustrated in Figure 2 of the drawing. The bearing head 5 is provided with the flattened portions 7 at diametrically opposite points on the outer face of the socket member 4 for accommodating a wrench or the like when it is desirous of securing the locking nut 6 in engagement with the socket member for the purpose of detaching the locking nut from engagement therewith as the case may be.

Adapted for longitudinal movement on the threaded shaft 1 is the internally threaded sleeve 8. An annular flange 9 is formed on the intermediate portion of the sleeve and the portion of the sleeve adjacent the flange 9 is threaded for detachably supporting thereon the circular ring 10, the front face thereof adapted to abut the rear face of the annular flange 9 in the manner as more clearly illustrated in Figure 2. The ring 10 is provided at diametrically opposite points with the openings 11 and the purpose thereof will be presently apparent.

A clamping wire such as is shown at 12 has its intermediate portion 13 extending around the object to be clamped directly opposite the bearing face of the bearing head 5 in the manner as clearly illustrated in the drawing. The object in the present illustration comprises a table leg, designated generally by the letter A, which has become broken and which is about to be secured by the clamp so that the adjacent faces of the sections of the broken table leg which are cemented may be properly held together.

The free ends of the clamping wire 12 are adapted to extend through the diametrically opposed openings 11 provided in the ring 10 and are twisted in the manner as shown at 14 for preventing the wire from becoming disengaged from the ring.

The rear end of the shaft 1 is substantially square in cross section as illustrated at 15 and the extreme rear end of the shaft is reduced and externally threaded as illustrated at 16. An operating lever 17 is provided intermediate its ends with a socket 18 which is adapted to fit over the square rear end 15 of the shaft 1 and a nut 19 is associated with the threaded outer end 16 for securing the lever in position on the rear end of the shaft.

One of the ends of the levers 17 is provided with a socket 20 similar to the socket 18 for cooperation with the square portion 15 of the shaft 1 when it is desired to obtain greater leverage.

It will be readily seen that when the lever is rotated in one direction, the shaft 12 is rotated and as the forward headed end thereof is swivelly mounted in the socket 4 of the bearing head 5 which is in engagement with one side of the object to be clamped, the sleeve 8 will move rearwardly on the threaded shaft simultaneously causing the ring 10 to engage the fastened free ends of the clamping wire, exerting a rearward pull upon the clamping wire and causing the intermediate portion 13 thereof to cooperate with the bearing head 5 in clamping the object with which the device is associated. By rotating the lever in the reverse direction, the sleeve moves forwardly on the threaded shaft and thus causes the clamping wire to be released from any tension and permitting the clamps to be readily disengaged from the object.

A clamp of the above mentioned object, may be efficiently used in connection with concrete forms or molds for holding the same in proper assembled relation or for any other suitable purpose.

The simplicity in which my improved clamp is constructed enables the same to be readily and easily operated and will at all times be efficient in carrying out the purposes for which the same is designated.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A clamp comprising a screw threaded shaft, a bearing head swivelly supported on the forward end of the shaft, a sleeve threaded on said shaft and adapted for longitudinal movement thereon, a ring mounted on said sleeve and having diametrically opposed openings provided therein, a clamping wire having the intermediate portion thereof cooperating with the bearing head, the free ends of the wire extending through said openings in said ring and being fastened together, and a tool detachably associated with the rear end of the shaft for actuating the same and moving the sleeve longitudinally thereon.

2. A clamp comprising a screw threaded shaft, a head formed on the forward end thereof, a bearing head having a socket for receiving the headed forward end of the shaft to swivelly support the bearing head thereon, means for securing the bearing head on the forward end of the shaft, a sleeve threaded on said shaft and adapted for longitudinal movement thereon, a ring mounted on the sleeve and having diametrically opposed openings formed therein, a clamping wire cooperating with the bearing head at its intermediate portion, the free ends of the clamping wire extending through the diametrically opposed openings in said ring and being fastened together, and means associated with the rear end of the shaft for rotating the same and moving the sleeve and said ring longitudinally thereon.

3. A clamp comprising a threaded shaft, a bearing head swivelly supported on the forward end thereof, a sleeve threaded on said shaft and adapted for longitudinal movement thereon, an annular flange formed on the intermediate portion of said sleeve, a ring threaded on said sleeve and adapted to have the front face thereof engage the adjacent face of the annular flange, said ring having openings formed therein at diametrically opposite points, a clamping wire having the intermediate portion thereof cooperating with the bearing head, the free ends of the clamping wire extending through the diametrically opposed openings in said ring and being fastened together, and means associated with the rear end of the shaft for rotating the same and moving the sleeve and said ring longitudinally thereon.

In testimony whereof I affix my signature.

EMMETT R. CLOUD.